United States Patent [19]

Blake

[11] Patent Number: 5,407,563
[45] Date of Patent: Apr. 18, 1995

[54] SCREENING PANELS

[75] Inventor: Peter R. Blake, Colchester, England

[73] Assignee: Brackett Green Limited, Colchester, United Kingdom

[21] Appl. No.: 976,555

[22] Filed: Nov. 16, 1992

[30] Foreign Application Priority Data

May 24, 1990 [GB] United Kingdom ............... 9011682
May 24, 1991 [WO] WIPO ............ PCT/GB91/00834

[51] Int. Cl.[6] .................................. B01D 33/09
[52] U.S. Cl. .................. 210/155; 210/161; 210/400; 210/402; 210/498; 210/499
[58] Field of Search ........... 210/494.3, 497.03, 493.1, 210/494.1, 400, 401, 402, 404, 397, 498, 499, 510.1, 155, 161; 55/500, 521, 523, 529

[56] References Cited

U.S. PATENT DOCUMENTS

| | | |
|---|---|---|
| 1,910,860 | 5/1933 | Sayers . |
| 2,667,881 | 2/1954 | Watkins et al. . |
| 2,996,189 | 8/1961 | Salterbach . |
| 3,235,086 | 2/1966 | Krynski . |
| 3,428,184 | 2/1969 | Kuper . |
| 3,850,804 | 11/1974 | Taylor et al. . |
| 4,360,426 | 11/1982 | Wetzel . |
| 4,541,930 | 9/1985 | Heidler et al. . |
| 4,582,601 | 4/1986 | Strow et al. . |
| 4,882,055 | 11/1989 | Stamstad . |
| 4,889,629 | 12/1989 | Jackson ........................... 210/498 |

FOREIGN PATENT DOCUMENTS

| | | |
|---|---|---|
| 37121/84 | 6/1986 | Australia . |
| 0291574 | 10/1987 | European Pat. Off. . |
| 549535 | 11/1922 | France . |
| 1352960 | 1/1963 | France . |
| 3419349A1 | 5/1984 | Germany . |
| 467079 | 6/1937 | United Kingdom . |
| 1330909 | 9/1973 | United Kingdom . |
| 1521255 | 8/1978 | United Kingdom . |
| 2045634A | 3/1980 | United Kingdom . |
| 2148733A | 6/1985 | United Kingdom . |
| 2199763A | 7/1988 | United Kingdom . |
| WO86/05219 | 9/1986 | WIPO . |

OTHER PUBLICATIONS

Double & Single Flow Bandscreens, William Green, 6 pages.
Single and Double Flow Band Screens—Drum & Cup Screens, Ledward and Beckett Limited, 12 pages.
FSM-Filterrechen, FSM-Frankenberger, Stahl and Maschinenbau OHC, 7 pages.
Finescreen, William Green Ltd. (Greenbank Engineering Group).
Automatic Water Screens, Blakeborough & Sons Ltd., Sep. 1976, Publication 309/B, 26 pages.
Screening Equipment Handbook, Tom M. Pankratz, 265 pages.

*Primary Examiner*—Robert A. Dawson
*Assistant Examiner*—W. L. Walker
*Attorney, Agent, or Firm*—Moore & Hansen

[57] ABSTRACT

A band screen (1) for installation across a channel (2) containing a flowing liquid (6) comprising an endless belt of screening panels (19), each provided with inwardly extending leading and trailing edge walls (26) and so attached to the belt as to be pivotable relative thereto. Cam plates (28) on the sides of the panels (19) slide along inner and outer guide tracks to control the panel orientations around the belt, causing the leading edge walls (26) to form upwardly facing steps on the upgoing side on the screen and to subsequently flatten to facilitate screening.

10 Claims, 2 Drawing Sheets

SCREENING PANELS

This application is the United States National Stage Application of International (PCT) Application Number PCT/GB/00834 filed on May 24, 1991, and applicant hereby claims priority therefrom and from Patent Application Ser. No. 9011682.3 (United Kingdom) filed on May 24, 1990.

The present invention relates generally to the field of water purification and treatment and is concerned particularly with a screening panel for removing solid material from a liquid in an early stage of a water purification system. Such screening panels are to be found, for example, in band screens and rotary screens in water and waste treatment plants, and are relatively large having an overall effective screening area that would usually be substantially more than 500 cm$^2$.

The design of a screening panel for such a system is at first sight straightforward. All that is required is a panel with a large number of suitably sized perforations. In a typical case, a panel would measure more than 20 cm × 30 cm and, even in the case where the perforations were relatively large, there would be more than 250 perforations on the panel. A complete screen would be made up of a number of (for example, from 4 to 80) panels.

Such screening panels have conventionally been made from perforated steel plate or from woven or welded wire mesh. Where steel plate is used, the perforations can be formed by punching or drilling out the steel plate. Where woven or welded wire mesh is used, square holes are often formed and a high percentage of open area can be provided, even with relatively small aperture sizes of for example a few mm.

With the advent of plastics materials, it has been proposed to manufacture screening panels from plastics material. In that case the panel is extruded as a sheet, cut to size and thereafter holes are drilled or punched in the panel to form the perforations. Drilling or punching the holes mimics the technique used when forming a panel from steel plate and does not pose any particular production problems.

British Patent Specification No. 1,521,255 describes a drum screen provided with plastics panels of 6 mm thickness and holes of 6 mm diameter formed by punching or drilling. The relatively thick panels define holes that are as deep as they are wide and that improves the performance of the panel as a screen.

At the present time, screening panels continue to be made in almost all cases of steel, either from steel mesh or by punching or drilling out steel plate.

A problem that arises with all screening panels of the kind referred to above is tat debris tends to become trapped in the openings in the panels. Considerable efforts have been made in the past to overcome the problem, for example by providing some form of cleaning arrangement to clean the panels either by vigorous back-washing or mechanical brushing periodically; also it has been found that increasing the length of the holes in the panels reduces the tendency of the openings to become blocked as a result of doubling-over or "hair-pinning" of the fibers.

It is an object of the present invention to provide an improved form of screening panel for use in a water treatment plant.

The present invention provides a screening panel for use in water and waste treatment plants for removing solid material from a flowing liquid by means of a plurality of screening panels, the screening panel being moulded from a plastics material and being provided with a plurality of holes formed during the moulding process.

Forming the holes in the screening panel by moulding (for example, by injection or pouring) has certain readily appreciated disadvantages:

a) because of the number of holes (more than 250) that will usually be found on a panel, and because a separate pin must be provided in the mould or forming tool for each hole to be formed, the forming of the mould is much more expensive than if the mould is designed to produce a plain (non-perforated) panel, b) the many separate pins, which necessarily are close to one another, means that the mould designer has to worry about flow of plastics material between the pins during the moulding process, c) the many separate pins make it difficult to remove the formed panel after moulding, and d) whereas moulding has significant cost advantages where mass production is involved, there is not usually the opportunity to make screening panels having a particular arrangement of holes in great numbers because different screening apparatus will generally require different sizes of apertures.

We have found, however, that whilst the disadvantages referred to above do apply, they are outweighed by the surprising advantages that forming the holes in the moulding process provides. First and foremost of those is that the screening panel is much less likely to become blocked than when a conventional panel is used. We have found that where the holes are formed by drilling or punching, there is inevitably some roughness in the vicinity of the hole, whereas when the holes are moulded they have smoother openings as well as a significantly smoother finish on the interior walls, as compared with holes formed by drilling or punching.

In an especially advantageous and important embodiment of the invention the screening elements are provided with tapered holes. The screens are mounted with the narrower ends of the holes facing the flow so that liquid being screened enters the holes through the narrow ends. In the past it has been relatively difficult to provide tapered holes because such holes cannot be readily or cheaply produced either by punching or drilling. The present invention, however, provides a simple, quick and inexpensive method of producing such holes. The tapering of the holes actually facilitates the removal of the screening panel from the mould. The tapered configuration of the holes provides a marked improvement in the performance of the screening panel. Whereas in the case of a straight hole, any fibers or particles entering that hole and having a width similar to the hole diameter would be likely to become lodged therein, with a tapered hole, such fibers or particles are much more likely to pass through any hole that they begin to enter since the hole increases in size downstream.

The invention may be employed to supply screening panels with aperture sizes ranging from 10 mm to as little as ½ mm but is especially applicable when holes of 5 mm or less, and in particular, 3 mm or less, are required. The use of a tapered hole confers advantages for all hole sizes, but becomes increasingly important as hole sizes decrease, in order to reduce clogging. When holes of 2 mm or less are required it is especially desirable for the holes to be tapered to prevent clogging.

Preferably, the holes are of circular cross-section so as to ensure uniformity of screening.

Preferably, the depth of each hole is greater than or equal to the greatest width of each hole on the screening side of the element. Such an arrangement, which can readily be provided when the holes are formed during moulding, is advantageous in preventing "hairpinning".

The invention is especially useful where a screening element of increased thickness, is required, for example having a thickness of 2 mm or more, where the use of a metallic element is less desirable, and in particular, of 9 mm or more, where the use of such an element becomes impracticable.

The present invention also provides a screening panel for use in a screening apparatus for removing solid material from a flowing liquid, the screening panel being moulded from a plastics material and being provided with a plurality of holes formed during the moulding process, the panel having a screening surface of an area greater than 500 cm$^2$, the holes each having a width of between about $\frac{1}{2}$ and 10 mm, a depth at least as great as the width and being tapered from a relatively wide end on one face of the panel to a relatively narrow end on the other face.

The screening panel is suitable for use in screening installations including a variety of screening apparatus. For example, it can be used in apparatus in which a plurality of such screening panels are brought in succession into a flowing liquid, such as, for example, on rotary screens of the drum, cup or disc type or on band screens. In the case of a band screen, it may be provided with moulded holes which, on the screening side, will usually have a minimum width of more than 2 mm (although minimum widths of $\frac{1}{2}$ mm may be possible with very fine sealing clearances). The screening panel may also be used on a screen known as a "brushed" or "fine brushed" screen, in which the panels are stationary.

The screening panel may be moulded from any plastics material that has suitable moulding characteristics, including a composite plastics material, such as, for example, a fiber-reinforced plastics material. One especially preferred material is polyurethane.

The invention also provides screening apparatus for removing solid material from a liquid flowing in a confined duct or channel, including a screening element that is moulded from plastics material and is provided with a plurality of holes formed during the moulding process.

A number of embodiments of the invention will now be described, by way of example only, with reference to the accompanying drawings, in which.

Figure 1:
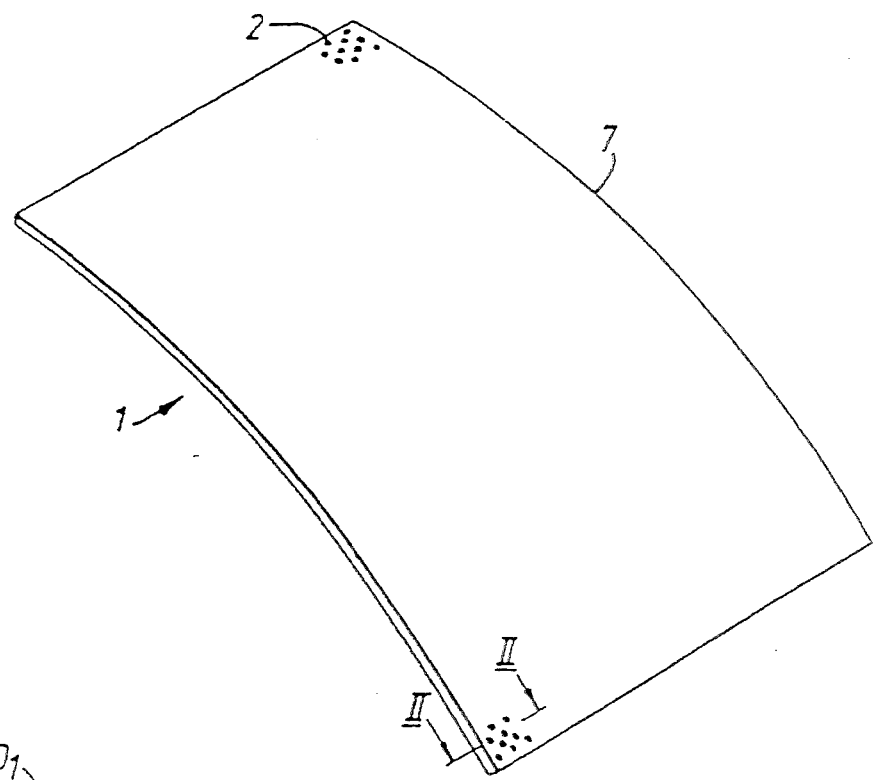
FIG. 1 is a schematic perspective view of a first screening panel for use on a drum screen.
Figure 3:
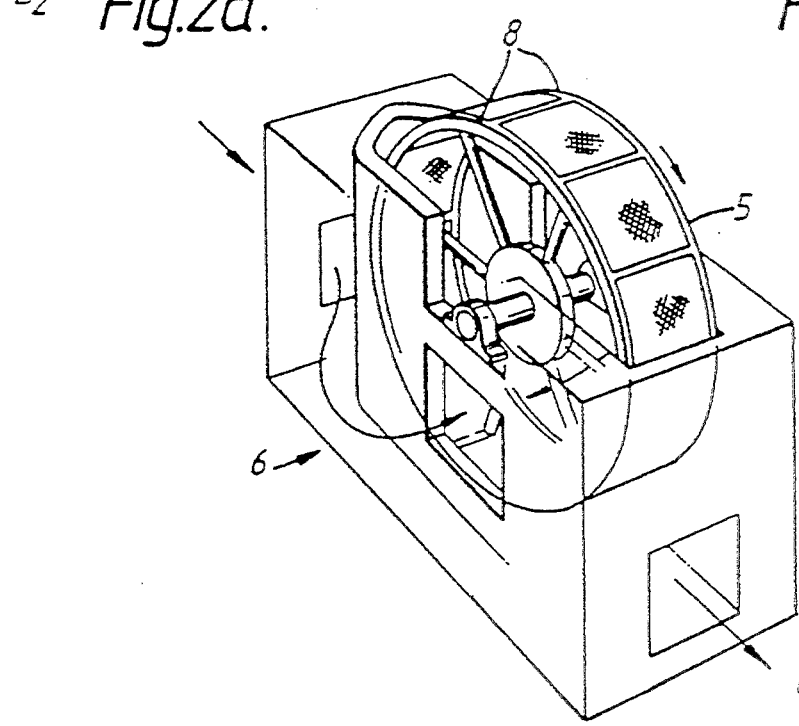
FIG. 3 is a schematic perspective view of the drum screen.

Referring to FIG. 1, the screening panel shown is suitable for use on a rotating drum screen of the type illustrated in FIG. 3.

The panel 1 is moulded with a plurality of apertures 2 from polyurethane. Each panel 1 is about 9 mm thick, has a length of about 1500 mm and a width of about 1000 mm.

Figure 2A:
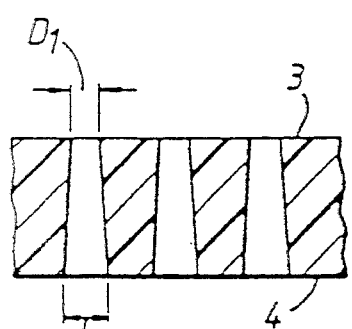
FIG. 2a is a partial sectional view of the panel along line II—II of FIG. 1, to a larger scale than FIG. 1.
Figure 2B:
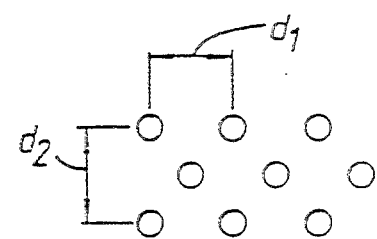
FIG. 2b is a schematic diagram snowing the arrangement of the apertures.

The moulded apertures 2 occupy 30% of the total area of each panel 1 and are of circular cross-section. The apertures 2 have a diameter $D_1$ of about 2 mm on the screening side 3 of the panel and, as may be seen from FIG. 2a, flare outwardly with distance therefrom, to a diameter $D_2$ of about 2.5 mm on the opposite surface 4. The arrangement of the apertures 1 is as shown in FIG. 2b, where $d_1$ and $d_2$ are 3.4 mm and 5.8 mm respectively.

The screening panels 1 are mounted as a single row about the periphery 5 of the 5 m diameter drum screen 6, so that their longer edges 7 extend around its circumference. In certain instances, two or more such rows of panels may, however, be, desirable. As indicated by arrows in FIG. 3, liquid enters the screen 6 through the two open sides thereof and flows outwardly through the screening panels 1 passing around the lowermost part of the screen. Thus, the screening side 3 of each panel faces radially inwards, with the holes tapering from 2.5 to 2 mm radially inwards.

The rims 8 of the screen 6 are finely sealed against the passage of debris, thereby permitting finer screening. Whereas previously 2 mm apertures would have been provided by means of perforated steel plate or wire mesh elements, the present invention permits the use of plastics material enabling a smooth low friction surface to be provided over the surface of the screen and in the moulded apertures. Furthermore by virtue of the moulding process, there is no difficulty in having a panel thickness of 9 mm, leading to a substantial reduction in the extent to which the screen becomes clogged.

The tapered configuration of the holes further alleviates clogging, and in fact, without such tapering, the use of a 2 mm aperture size in conjunction with the 9 mm panel thickness, is unlikely to have been feasible. The tapered configuration is, of course, particularly suited for use with rotary screens where (in contrast, for example, to uniflow band screens) the liquid to be screened flows through the screening panels in only one direction.

A further advantage of the tapered hole construction is that it facilitates the removal of the panel from the mould.

Figure 4:
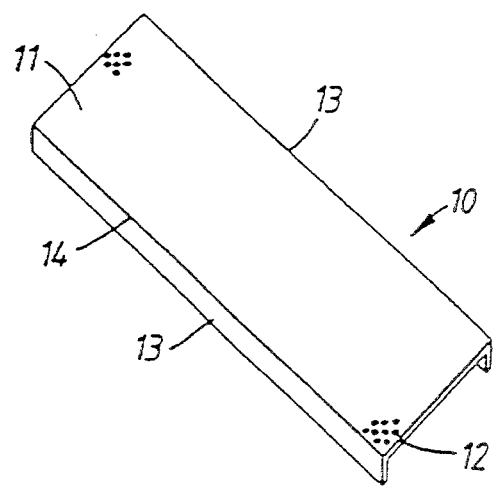
FIG. 4 is a schematic perspective view of a second screening panel for use on a band screen; and, FIG. 5 is a longitudinal sectional view of the band screen.
Figure 5:
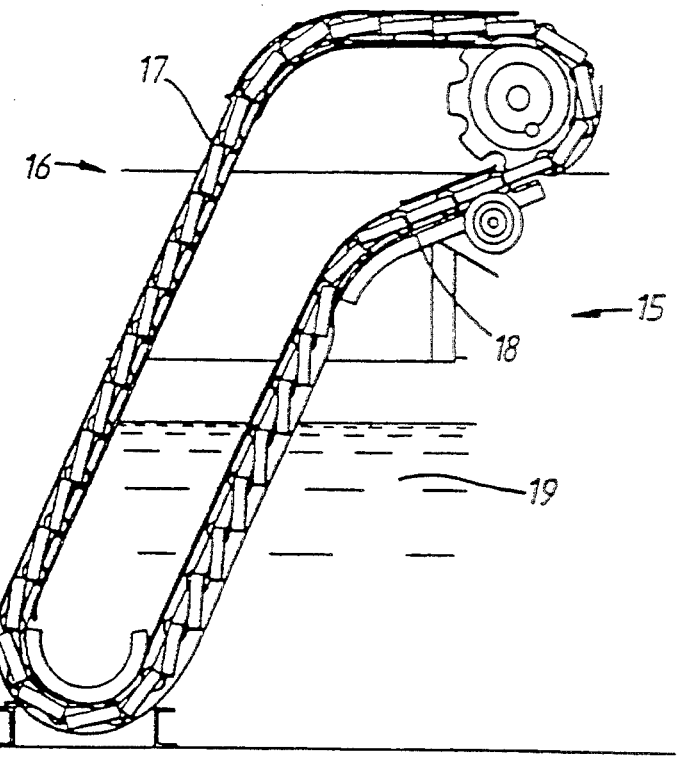

FIG. 4 shows an alternative type of screening panel for use on a uniflow band screen, as illustrated in FIG. 5.

The panel 10 is moulded from polyurethane and comprises a rectangular screening face 11 provided with a plurality of apertures 12 therein, and two solid edge faces 13 extending perpendicularly away from the longer edges 14 of the screening face 11, respectively. The panel 10 has a length of about 80 cm, a width of about 20 cm, and a thickness of about 5 mm, the edge faces 13 each having a width of about 4 cm.

The apertures 12 in the screening face 11 are formed during the moulding process. Each aperture 12 has a constant circular cross-section of 5 mm diameter, and of course, has a length of about 5 mm. The apertures 12 are arranged in rows about 7 mm apart, the centers of adjacent apertures in a row being separated by about 12 mm, adjacent apertures in alternate rows being offset by 6 mm. The apertures occupy about 50% of the effective screening area.

Referring to FIG. 5, each panel 10 is pivotally mounted lengthwise across the screen 15, with its edge faces 13 directed towards the interior of the screen so that the screening faces 11 of the panels face outwardly around the panel belt. In this band screen, cam means (not shown) are provided on the sides of the panels and travel along inner and outer guide tracks disposed around the path of the belt of panels so as to control the orientations of the panels 1.

During operation, on the upgoing side 16 of the panel belt, the leading edge faces 13 of the panels 10 are caused to move outwardly to form rising steps 17 that lift debris out of the flow. At the top of the screen, those edge faces 13 move inwardly again, causing the debris to be knocked off the panels. The panels 10 are then caused to flatten to form a smooth surface 18, whereupon the panels are brushed and backwashed to remove finer screenings. The panels 10 then move downwardly and re-enter the flow 19 in the reverse orientation.

In this particular screen, stainless steel perforated plate panels having a 2 mm thickness and an aperture size of 6 mm were originally employed. When, in accordance with the invention, the panels were replaced by plastics panels provided with apertures of a similar size, the performance of the screen was found to be markedly improved over the original screen. In addition to the improvement in the frictional characteristics of the screening surfaces, the provision of the moulded apertures in the panels was found to result in fewer screenings being trapped in the apertures than was the case in the apertures of the perforated steel plate panels.

By virtue of the moulding process, it has also been possible to form the plastics panel of a thickness whereby the length of each aperture is at least as great as its diameter. This ratio significantly reduces the amount of "hairpinning" that occurs and also contributes to the improvement in performance.

In fact, the improved performance of the moulded plastics panel over the metal panel means that it may be possible to dispense entirely with backwashing spray jets (which contribute substantially to the running costs of the screen), or at least to reduce backwashing to short periods.

The holes in the panels are of constant cross-section. However, if smaller aperture sizes are used, it may be desirable to make the holes tapered.

I claim:

1. A screening apparatus for removing solid material from a flowing liquid, comprising:
    a plurality of screening panels;
    mounting means mounting each screening panel for travel around an endless path passing into and out of the liquid;
    each screening panel having a first screening face which directly confronts the flowing liquid, and a second face opposite to the first face, and each screening panel being molded from a plastic material and being provided with a plurality of holes formed during molding of the panel; and
    the holes extending through each panel from the first screening face to the second face and with no panel structure in confronting relation to the hole openings on the second face, thereby permitting unimpeded liquid flow through the openings terminating at each face in an uncovered, freely exposed opening, each hole being of a first diameter at said first face of the screening panel and increasing progressively in diameter from said first face towards said second face and being of a second diameter greater than said first diameter at said second face of the screening panel.

2. A screening apparatus as claimed in claim 1, wherein the widths of the holes on the screening face of the screening panel are less than or equal to 5 mm.

3. A panel as claimed in claim 2, wherein the widths of the holes on the screening side of the panel are less than or equal to 2 mm.

4. A screening apparatus as claimed in claim 1, wherein the screening panel has a thickness of 2 mm or more.

5. A screening apparatus as claimed in claim 1, wherein the plastic material is polyurethane.

6. A screening apparatus as claimed in claim 1, in which the apparatus is a band screen.

7. A screening apparatus as claimed in claim 1, wherein the screening apparatus is a rotary structure of the drum, cup or disc type comprised of said plurality of screening panels.

8. A screening apparatus as claimed in claim 1, wherein the panel has a depth defined by the distance between said first and second faces greater than said first diameter.

9. A screening apparatus as claimed in claim 1, wherein said holes are of circular cross-section.

10. A screening apparatus as claimed in claim 1, wherein the depth of each hole is greater than or equal to the greatest width of each hole on the first screening face of the screening panel.

* * * * *

UNITED STATES PATENT AND TRADEMARK OFFICE
CERTIFICATE OF CORRECTION

PATENT NO. : 5,407,563
DATED : April 18, 1995
INVENTOR(S) : Peter R. Blake

It is certified that error appears in the above-indentified patent and that said Letters Patent is hereby corrected as shown below:

On the title page,

Item [22] should read as follows:
-- PCT Filed: May 24, 1991 --.

Item [86] is not present but should be and read as follows:
-- PCT No.: PCT/GB91/00834 --.
-- Section 371 Date: NOvember 16, 1992 --
-- Section 102(e) Date: November 16, 1992 --.

Item [87] is not present but should be and read as follows:
-- PCT Pub. No.: WO 91/17808 --
-- PCT Pub. Date: November 28, 1991 --.

Item [30] should read as follows:
-- May 24, 1990 [GB] United Kingdom 9011682 --.

Signed and Sealed this

Twenty-first Day of July, 1998

Attest:

BRUCE LEHMAN

*Attesting Officer*   *Commissioner of Patents and Trademarks*